UNITED STATES PATENT OFFICE.

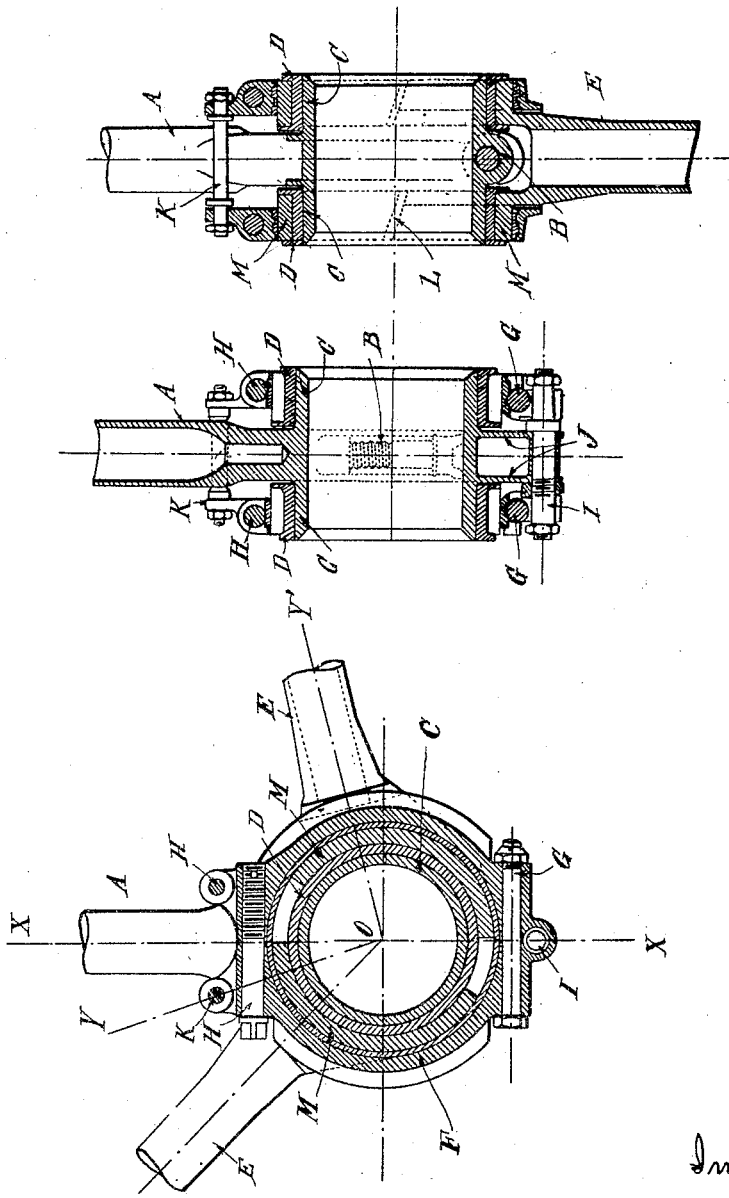

AUGUSTE MAIRE, OF ARGENTEUIL, FRANCE, ASSIGNOR TO MARIUS JEAN BAPTISTE BARBAROU, OF NEUILLY-SUR-SEINE, FRANCE.

CONNECTING-ROD FOR INTERNAL-COMBUSTION ENGINES.

1,368,179.     Specification of Letters Patent.     Patented Feb. 8, 1921.

Application filed May 7, 1918. Serial No. 233,028.

*To all whom it may concern:*

Be it known that I, AUGUSTE MAIRE, citizen of the Republic of France, residing at Route de Bezons, Argenteuil, Seine and Oise, in the Republic of France, have invented new and useful Improvements in Connecting-Rods for Internal-Combustion Engines, of which the following is a specification.

This invention has for its object to provide an improved construction for coupling the big ends of connecting rods to the common crankpin of a V-engine having several lines of cylinders.

This construction is particularly applicable to engines wherein it is desired to arrange in one and the same plane three cylinders whose axes inclose with each other any suitable angle, for instance 60°.

The improvement consists essentially in pivoting the central connecting rod directly upon the crankpin of the crank shaft, and in arranging secondary connecting rods to bear upon bushings that are mounted on bearing surfaces formed on the said central connecting rod in the plane of the rotation, according to the forces acting upon them. These secondary connecting rods are held together in position by collars that share the motion of the central connecting rod with a slight amount of "play" so as to assure a proper working.

The accompanying drawings illustrate by way of example one constructional form of the invention, Figure 1 is a section of the improved coupling of three connecting rods in a plane at right angles to the crankpin of the crank shaft.

Fig. 2 is a section on the line XOX' of Fig. 1.

Fig. 3 is a section of the line YOY' of Fig. 1, the sectional planes YO and OY' being assumed to be turned down respectively upon the planes XO and OX'.

The big end of the central or main connecting rod A comprises as usual two halves connected at their sides by bolts B; it is mounted directly upon the crankpin of the crank shaft, and it has two turned bearing surfaces C upon which bear two bushings D each made in two parts. Upon these bushings there bear the arcuate segments M that form the big ends of the secondary connecting rods E. These connecting rods are held together and in place by two collars F each composed of two parts connected at their lower portions by a bolt G and at their upper portions by a screw H. The two collars F are rendered relatively as it were in one piece with the main connecting rod A by means of a pin I that passes through cheeks J forming part of the central connecting rod A. At the upper part, pins K connecting the two collars on either side of this central connecting rod, prevent these two collars from moving apart during the working.

The bushings D upon which the secondary connecting rods bear, are, as will be seen, floating; in other words they are able to shift around the axis of the crankpin according to the main forces acting upon them, this having the result of diminishing in a rather considerable degree the sliding friction between the bushings and the main connecting rod on the one hand and the bushings and the twin secondary connecting rods on the other hand. This is one of the essential characteristic features of the improved construction of connecting rods according to this invention.

The split in the secondary connecting rods, instead of being parallel to the main axis of the crankpin, may be oblique as shown in dot and dash lines at L (Fig. 3) so as to provide the largest possible bearing area between each secondary connecting rod and its bushing.

This arrangement allows of assuring lubrication under the pressure of the central connecting rod and the secondary connecting rods.

Having now described my invention, what I claim as new and desire to secure by Letters Patent is:

1. A device for assembling around a crank shaft the connecting rods of motors having inclined cylinders, comprising in combination a main connecting rod, the big end of which is adapted to directly surround the crank shaft, two floating bushings around said big end, one on each side of the body of the main connecting rod, secondary connecting rods provided with side segmental members adapted to bear on the outer surface of said bushings, divided collars encircling the said segmental members, means for holding together the two parts of each collar, cheeks provided on the outer surface of the big end of the main connecting rod, in the space between the two collars and a fastening pin extending transversely through said cheeks and the collars.

2. A device for assembling around a crank shaft the connecting rods of motors having inclined cylinders, comprising in combination a main connecting rod, the big end of which is adapted to directly surround the crank shaft, two floating bushings around said big end one on each side of the body of the main connecting rod, secondary connecting rods provided with side segmental members adapted to bear on the outer surface of said bushings, divided collars encircling the said segmental members, means for holding together the two parts of each collar, cheeks provided on the outer surface of the big end of the main connecting rod, in the space between the two collars, a fastening pin extending transversely through said cheeks and the collars and means for connecting the collars to each other at a point which is substantially diametrically opposite the said fastening pin.

3. A device for assembling around a crank shaft the connecting rods of a motor having inclined cylinders comprising in combination a main connecting rod, the big end of which is adapted to directly surround the crank shaft and composed of two substantially semi-cylindrical parts, pins arranged in the median plane of the device for holding said parts together, two floating bushings arranged around said big end, one on each side of the body of the main connecting rod, secondary connecting rods provided with side segmental members adapted to bear on the outer surface of said bushings, said secondary connecting rods having recesses for the passage of the said pins, and collars encircling the said segmental members.

In testimony whereof I have signed my name to this specification in the presence of two subscribing witnesses.

AUGUSTE MAIRE.

Witnesses:
 LOUIS MOSÉ,
 CHAS. P. PRESSLY.